United States Patent [19]

Jones

[11] Patent Number: 5,031,441
[45] Date of Patent: Jul. 16, 1991

[54] TWO ARM ROBOT

[75] Inventor: Everett E. Jones, Wichita, Kans.

[73] Assignee: The Boeing Company, Seattle, Wash.

[21] Appl. No.: 469,022

[22] Filed: Jan. 23, 1990

Related U.S. Application Data

[63] Continuation-in-part of Ser. No. 226,552, Jul. 29, 1988, which is a continuation-in-part of Ser. No. 107,477, Oct. 13, 1987, abandoned, which is a continuation of Ser. No. 942,261, Dec. 16, 1986, Pat. No. 4,700,308, which is a continuation of Ser. No. 726,701, Apr. 24, 1985, abandoned.

[51] Int. Cl.$^5$ ............................................. B25J 9/00
[52] U.S. Cl. ...................................... 72/420; 414/753; 901/8; 901/16; 901/29; 901/41
[58] Field of Search ......................... 414/749, 751–753; 901/8, 16, 29, 41, 9; 72/420, 422

[56] References Cited

U.S. PATENT DOCUMENTS

| Re. 25,886 | 10/1965 | Cargill | 29/200 |
|---|---|---|---|
| Re. 25,956 | 2/1966 | Williamson | 90/11 |
| Re. 26,770 | 1/1970 | Lemelson | 29/33 |
| Re. 30,016 | 5/1979 | Hohn | 364/474 |
| 3,010,371 | 11/1961 | Riedel et al. | 90/21 |
| 3,049,247 | 8/1962 | Lemelson | 414/273 |
| 3,052,011 | 9/1962 | Brainard et al. | 29/26 |
| 3,188,736 | 6/1965 | Brainard et al. | 29/568 |
| 3,451,224 | 6/1969 | Colechia et al. | 901/41 X |
| 3,709,623 | 1/1973 | Stephan et al. | 408/22 |
| 3,845,286 | 10/1974 | Aronstein | 235/151.1 |
| 4,237,598 | 12/1980 | Williamson | 29/568 |
| 4,272,812 | 6/1981 | Svensson | 364/475 |
| 4,342,088 | 7/1982 | Sato | 364/474 |
| 4,369,563 | 1/1983 | Williamson | 29/568 |
| 4,427,431 | 1/1984 | Mumford | 65/163 |
| 4,430,041 | 2/1984 | Hemingway et al. | 72/420 X |
| 4,598,380 | 7/1986 | Holmes et al. | 364/513 |
| 4,685,180 | 8/1987 | Kitaya et al. | 29/33 R |
| 4,697,239 | 9/1987 | Sicard | 364/468 |
| 4,700,308 | 10/1987 | Jones | 901/6 X |
| 4,714,339 | 12/1987 | Lau et al. | 356/4.5 |

FOREIGN PATENT DOCUMENTS 2120202 11/1983 United Kingdom ................. 901/16

Primary Examiner—Robert J. Spar
Assistant Examiner—Donald W. Underwood
Attorney, Agent, or Firm—Finnegan, Henderson, Farabow, Garrett & Dunner

[57] ABSTRACT

A two arm robot for selectively manipulating a workpiece comprising an elongated cross beam assembly having an elongated axis extending between opposed ends, a frame assembly supported by the cross beam assembly for selective linear movement parallel to Y and Z axes and for selective pivotal movement about the elongated axis, the elongated axis being parallel to the X axis and the X, Y and Z axis being orthogonal, a pair of arm assemblies supported by the cross beam assembly for selective independent linear movement parallel to the X and Y axes, a wrist assembly operatively supported by each arm assembly and including a motor for selectively moving the wrist assembly about a rotation axis parallel to the Z axis, and motor and mounting structure for moving the arm assemblies relative to the cross beam assembly parallel to the X and Y axes.

18 Claims, 16 Drawing Sheets

TWO ARM ROBOT

RELATED APPLICATIONS

This application is a continuation-in-part of U.S. patent application, Ser. No. 07/226,552, filed Jul. 29, 1988, which is a continuation-in-part of U.S. patent application, Ser. No. 07/107,477, filed Oct. 13, 1987, now abandoned, which was a continuation of U.S. patent application, Ser. No. 06/942,261, filed Dec. 16, 1986, which issued as U.S Pat. No. 4,700,308, and which was a continuation of U.S. patent application Ser. No. 06/726,701, filed Apr. 24, 1985 and now abandoned.

BACKGROUND OF THE INVENTION

1. Field of the Invention

The invention is directed to a two-arm robot for manipulating workpieces in a computerized manufacturing facility and in particular to a two arm robot for use as a part of a brake press apparatus.

2. Description of Related Information

Automated, computer-controlled manufacturing systems are known. Exemplary of such systems and associated work stations are U.S. Pat. Nos. 3,845,286, 4,369,563, 4,272,812, 4,342,088, 4,427,431, 4,237,598, Re.25,886, Re.25,956, Re.26,770, 3,052,011, 3,010,371, 3,049,247, 3,188,736, and 3,709,623.

The present invention provides a two arm robot for manipulating workpieces, particularly planar workpieces such as sheet metal parts and the like. The invention is particularly designed for use in conjunction with a system broadly described in U.S. Pat. No. 4,700,308 and pending application Ser. No. 07/226,552, filed Jul. 29, 1988. Other components of the automated manufacturing system are disclosed in pending U.S. application Ser. No. 07/358,429, filed May 30, 1989, allowed U.S. patent application Ser. No. 07/251,241, filed Sept. 30, 1988, and U.S. Pat. No. 4,802,357.

The two arm robot of the invention has particular application in a brake press apparatus.

Advantages of the invention are set forth in part in the description which follows, and in part will be obvious from the description, or may be learned by practice of the invention.

SUMMARY OF THE INVENTION

The advantages of the invention may be realized and attained by means of the instrumentalities and combinations particularly pointed out in the appended claims.

The invention, as embodied and broadly described herein, is a two arm robot for selectively manipulating a workpiece, the robot comprising an elongated crossbeam assembly having an elongated axis extending between opposed ends, a frame assembly including translation means supporting the cross beam assembly for selective linear movement parallel to Y and Z axes and for selective pivotal movement about the elongated axis, the elongated axis being parallel to a X axis and the X, Y and Z axes being orthogonal; a pair of arm assemblies supported by the cross beam assembly for selective, independent linear movement parallel to the X and Y axes; a wrist assembly operatively supported by each arm assembly and including power means for selectively moving the wrist assembly about a rotation axis parallel to the Z axis; and means for selectively moving the arm assemblies relative to the cross beam assembly.

Preferably, the robot includes means for sensing the amount, direction and rate of movement of each arm assembly, wrist assembly, and the cross beam assembly.

It is also preferred that the robot include computer means in operative communication with the sensing means, translation means, power means and moving means for controlling operation of the robot.

In a preferred embodiment, the robot of the invention is disposed in a computer-controlled press brake apparatus comprising means for presenting a workpiece to the apparatus in position for selective gripping and manipulation by the robot, a press brake having two adjacent operative areas between a bed and a ram, each operative area being disposed to place a bend on a workpiece disposed therein in a direction opposite the other area, the press brake being disposed for selective placement by the robot of the workpiece in the operative areas and a computer in operative communication with the receiving means, the press brake and the operative elements of the robot for controlling operation of the apparatus to manipulate and bend a workpiece in accordance with a predetermined design therefor stored in the computer.

BRIEF DESCRIPTION OF THE DRAWINGS

The accompanying drawings, which are incorporated in and constitute a part of the specification, illustrate embodiments of the invention, and, together with the description, serve to explain the principles of the invention.

DESCRIPTION OF THE PREFERRED EMBODIMENT

Reference will now be made in detail to the present preferred embodiment of the invention, examples of which are illustrated in the accompanying drawings.

The two arm robot is particularly intended for use in conjunction with a computer controlled manufacturing system. The two arm robot has particular application as a part of a brake press station in such a computer controlled manufacturing system. The concept of workpiece orientation in such a system and in such a brake press apparatus using a two armed robot is disclosed in U.S. Pat. No. 4,700,308. The computer control mechanism and software for operating the computer controlled manufacturing system, and for operating the two armed robot and brake press apparatus, is disclosed in co-pending, allowed U.S. patent application, Ser. No. 07/226,552, filed Jul. 29, 1988, which application is hereby specifically incorporated by reference.

Figure 1:
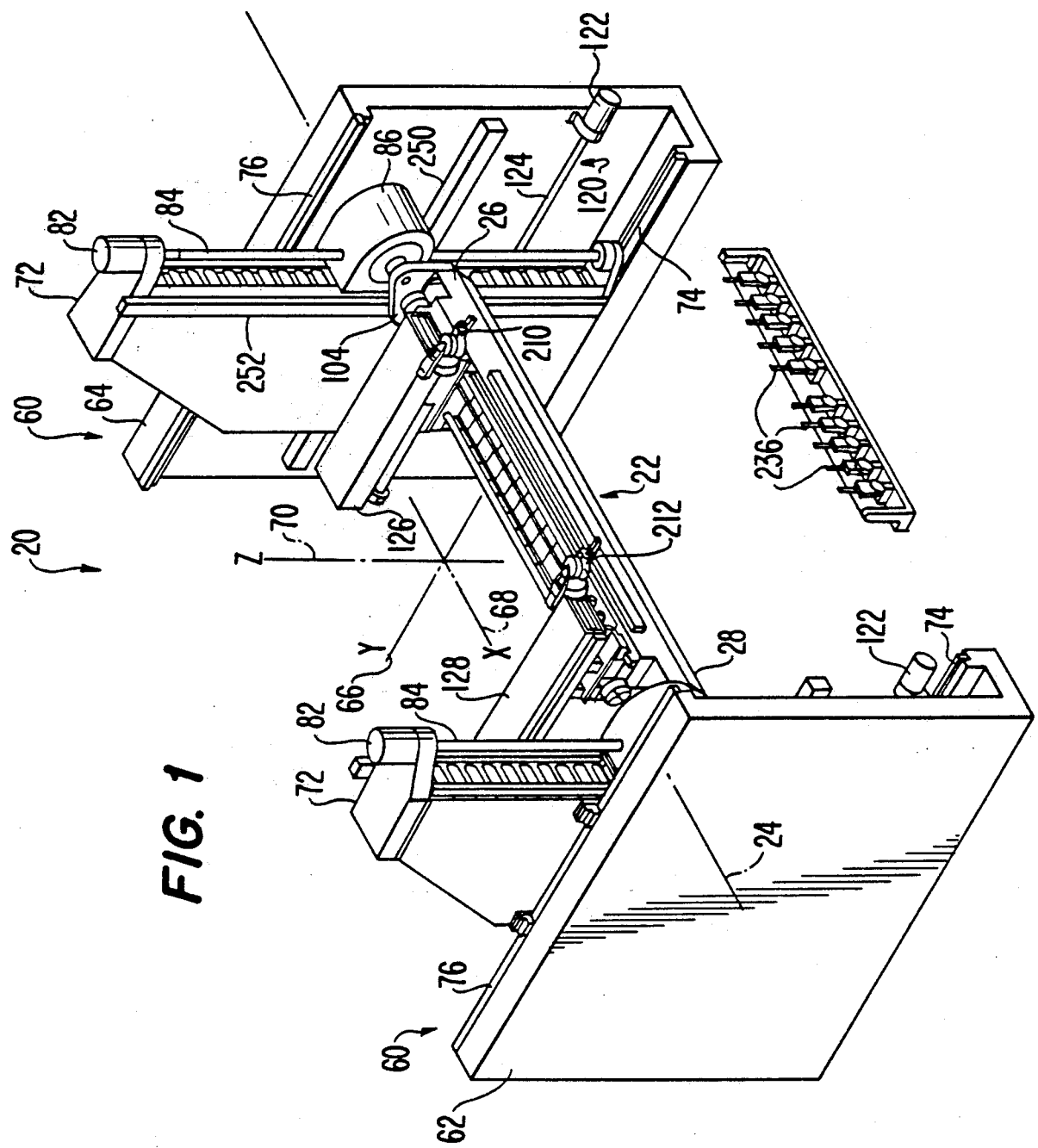
FIG. 1 is a perspective view of the two arm robot of the invention.

In accordance with the invention, the two-arm robot for selectively manipulating a workpiece comprises an elongated cross beam assembly having an elongated axis extending between opposed ends. As depicted in FIG. 1, the robot 20 includes elongated cross beam assembly 22 having an elongated axis 24 extending between opposed ends 26, 28. Preferably, a depicted in FIGS. 13 and 14, cross beam assembly 22 comprises a base structure 30 extending between opposed ends 26, 28, and elongated track 32, 34 extending parallel to elongated axis 24 between opposed ends 26, 28, and a pair of first attachment plates 36 (only one shown in FIGS. 13 and 14) carried by elongated track 32, 34 for independent linear movement along the elongated axis 24.

Figure 2:
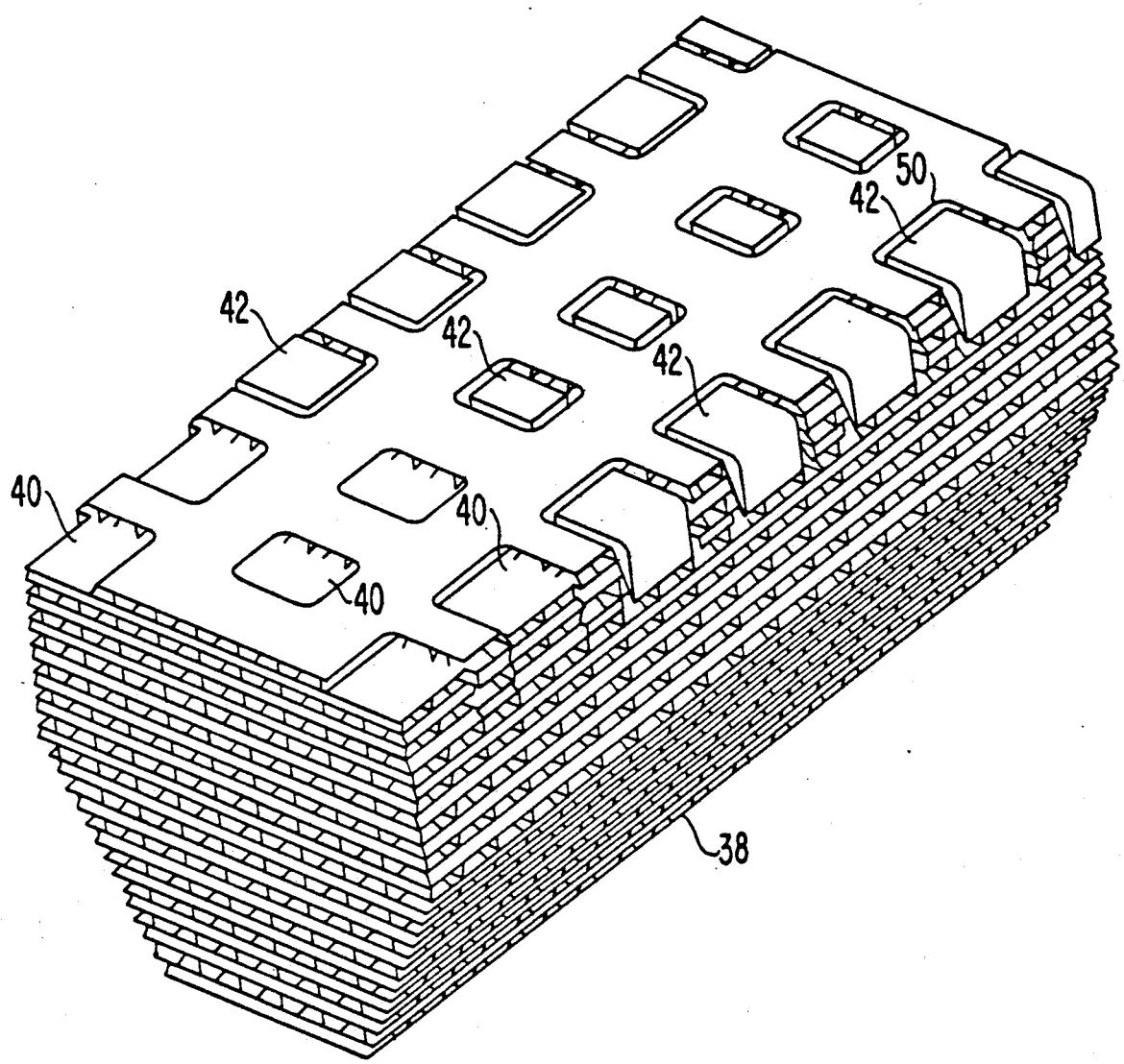
FIG. 2 is a cut-away perspective view of a portion of the base structure of the cross beam assembly of the invention.
Figure 3:
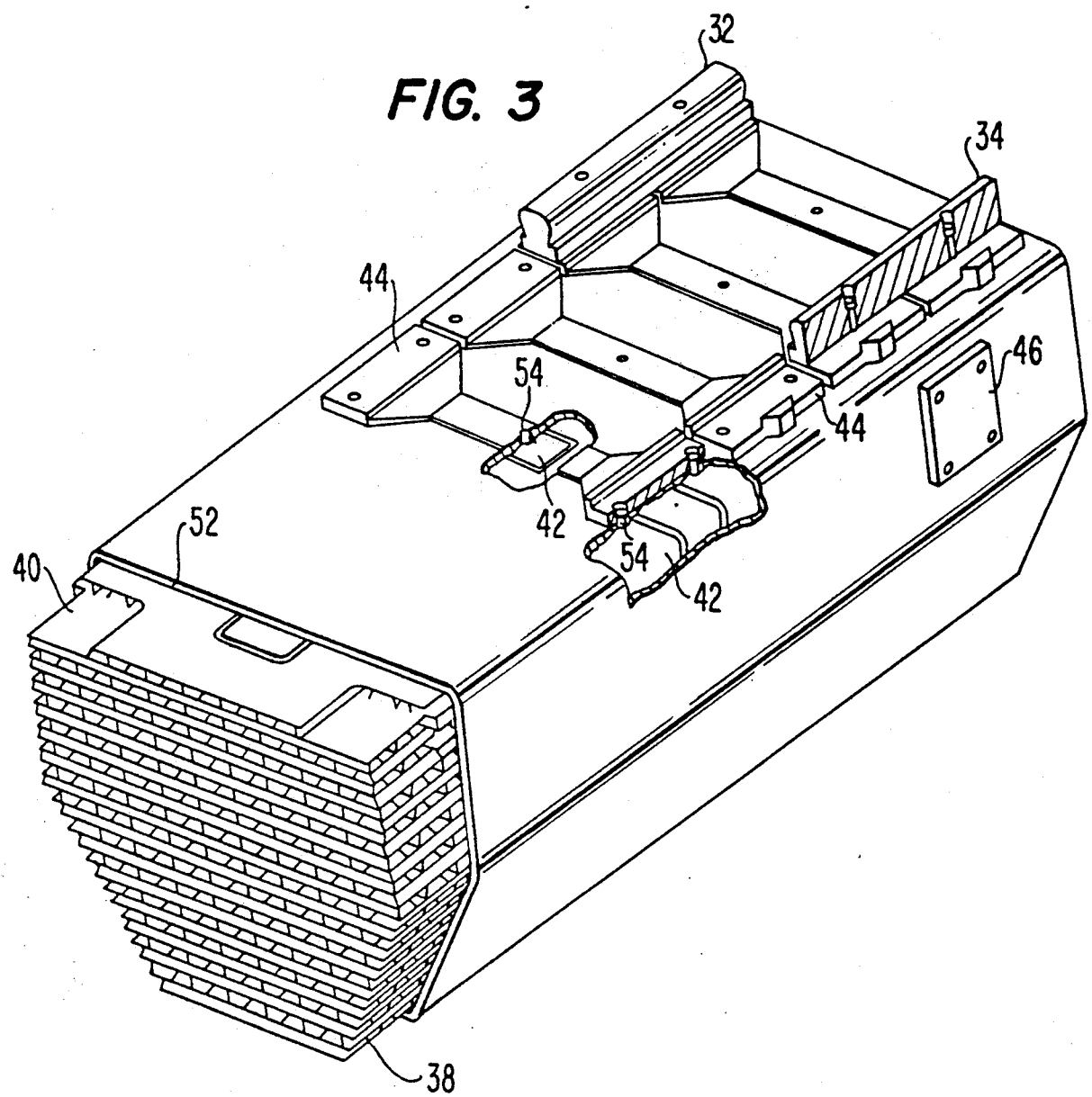
FIG. 3 is a partial cut-away perspective view of the base structure of the cross beam assembly of the invention.
Figure 4:
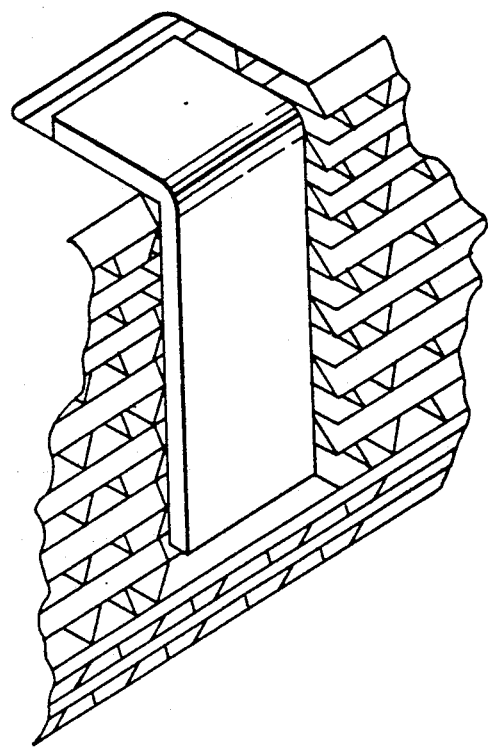
FIG. 4 is an enlarged view of a mounting element in the base structure of the cross beam assembly of the invention.
Figure 7:
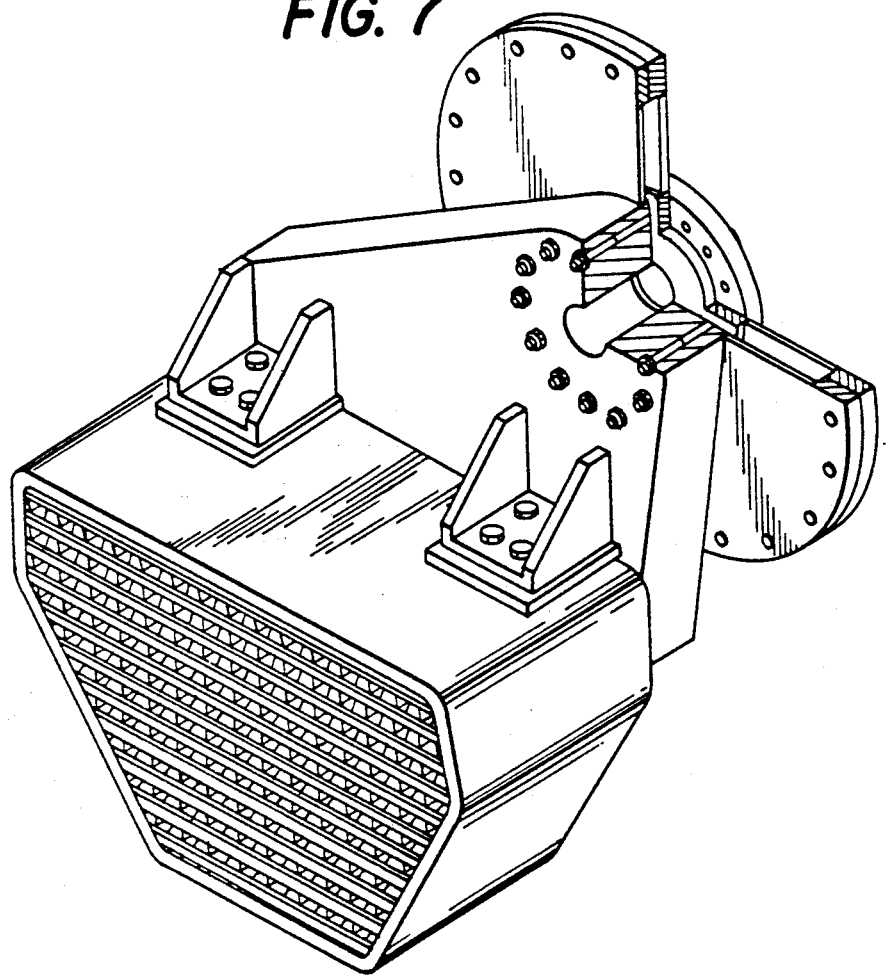
FIG. 7 is an enlarged view of a portion of the apparatus depicted in FIG. 6.
Figure 13:
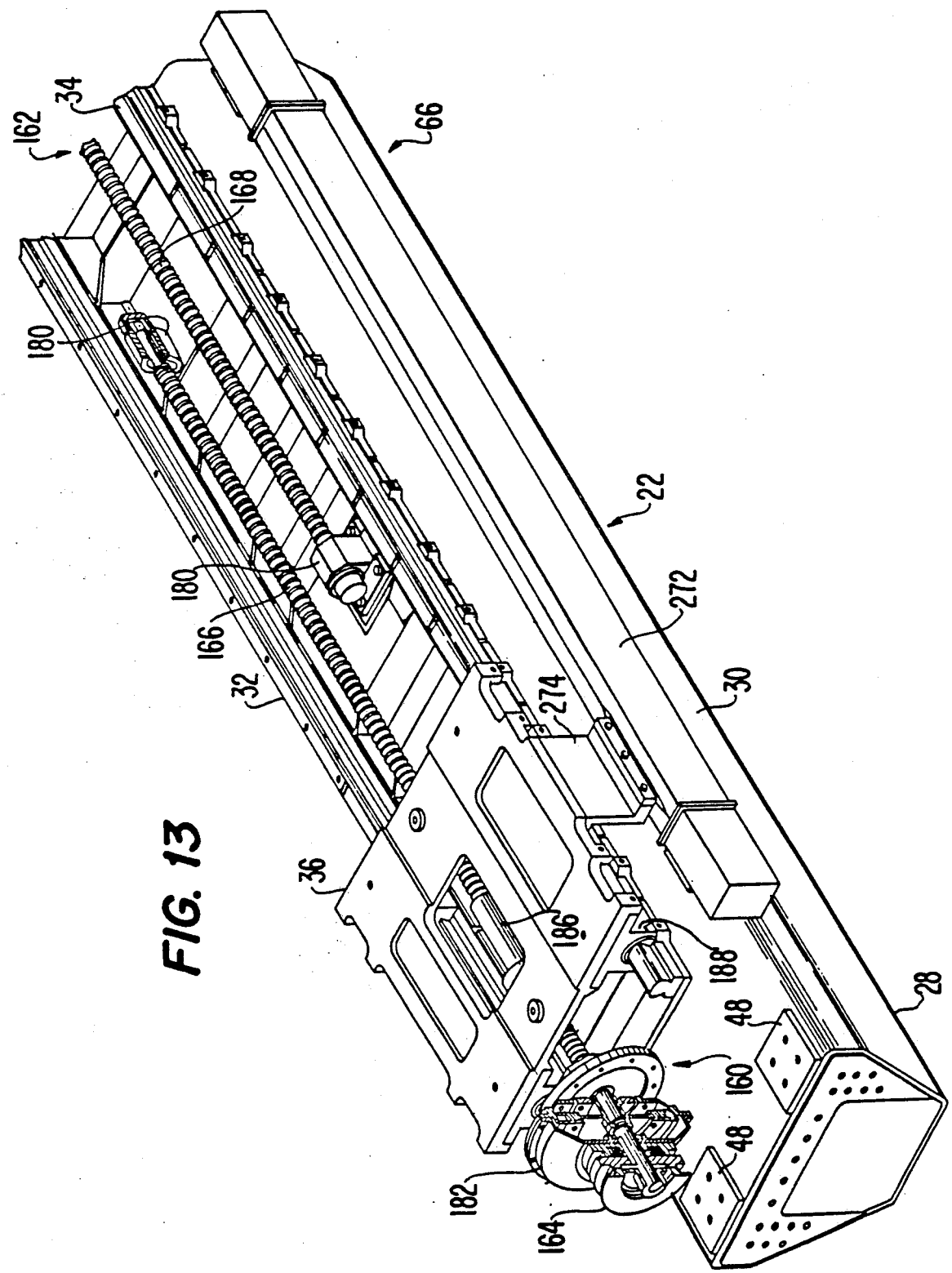
FIG. 13 is a partially cut-away perspective view of the cross beam assembly depicted in FIG. 1.

In the preferred embodiment, base structure 30 of cross beam assembly 22 is a light weight rigid assembly including a core 38 (FIG. 2) of non-metal honeycomb material. As depicted in FIGS. 2 and 4, core 38 is formed with pockets 40 for receiving metal inserts 42 located both in the center surface and sides of core 38. In addition, opposed ends 26, 28 are formed with pockets 40. The pockets are strategically located to place metal inserts 42 in position for attachment of base plates 44 and side attachment plates 46 (FIG. 3) and for attachment of yoke base plates 48 (FIG. 13).

As depicted in FIG. 2, metal inserts 42 are held in place by a potting matrix 50 which locks inserts 42 with honeycomb core 38. After metal inserts 42 are fixed in place, core 38 is wrapped with a bonding material and a series of thermoset graphite laminates 52 (FIG. 3) and cured using normal cure procedures for such material. After the laminate 52 is in place, base plates 44, 46 and 48 are secured to the metal inserts imbedded in core 38 by, for example, screws 54, adhesives or other known attachment means. The base plates serve as the attachment structure for components of the cross beam assembly such as track 32, 34.

In accordance with the invention, the two arm robot further includes a frame assembly including translation means supporting the cross beam assembly for selective linear movement parallel to Y and Z axes and for selective pivotal movement about the elongated axis, the elongated axis being parallel to an X axis and the X, Y and Z axes being orthogonal.

In the preferred embodiment, as depicted in FIG. 1, the frame assembly 60 comprises a pair of opposed support structures 62, 64 disposed in spaced, parallel relation to Y axis 66. X, Y and Z axes 68, 66, 70, respectively, are orthogonal axes used for reference purposes and for describing the operation and function of the invention. For example, Y axis 66 defines a center line between the opposed support structures 62, 64 of frame assembly 60.

As depicted in FIG. 1, each support structures 62, 64 includes a translation means comprising first drive means supporting opposed ends 26, 28 of cross beam assembly 22 for selective pivotal movement about elongated axis 24, second drive means supporting first drive means for selective linear movement parallel to Z axis 70, the second drive means being supported by respective support structures 62, 64 for linear movement parallel to Y axis 66, and third drive means for selectively moving second drive means relative to the respective support structure 62, 64 parallel to the Y axis. Since a translation means on each support structure 62, 64 comprising first, second and third drive means are essentially mirror images of each other, the translation means will be described for one support structure with the understanding that the other support structure has similar component in similar dispositions.

Figure 5:
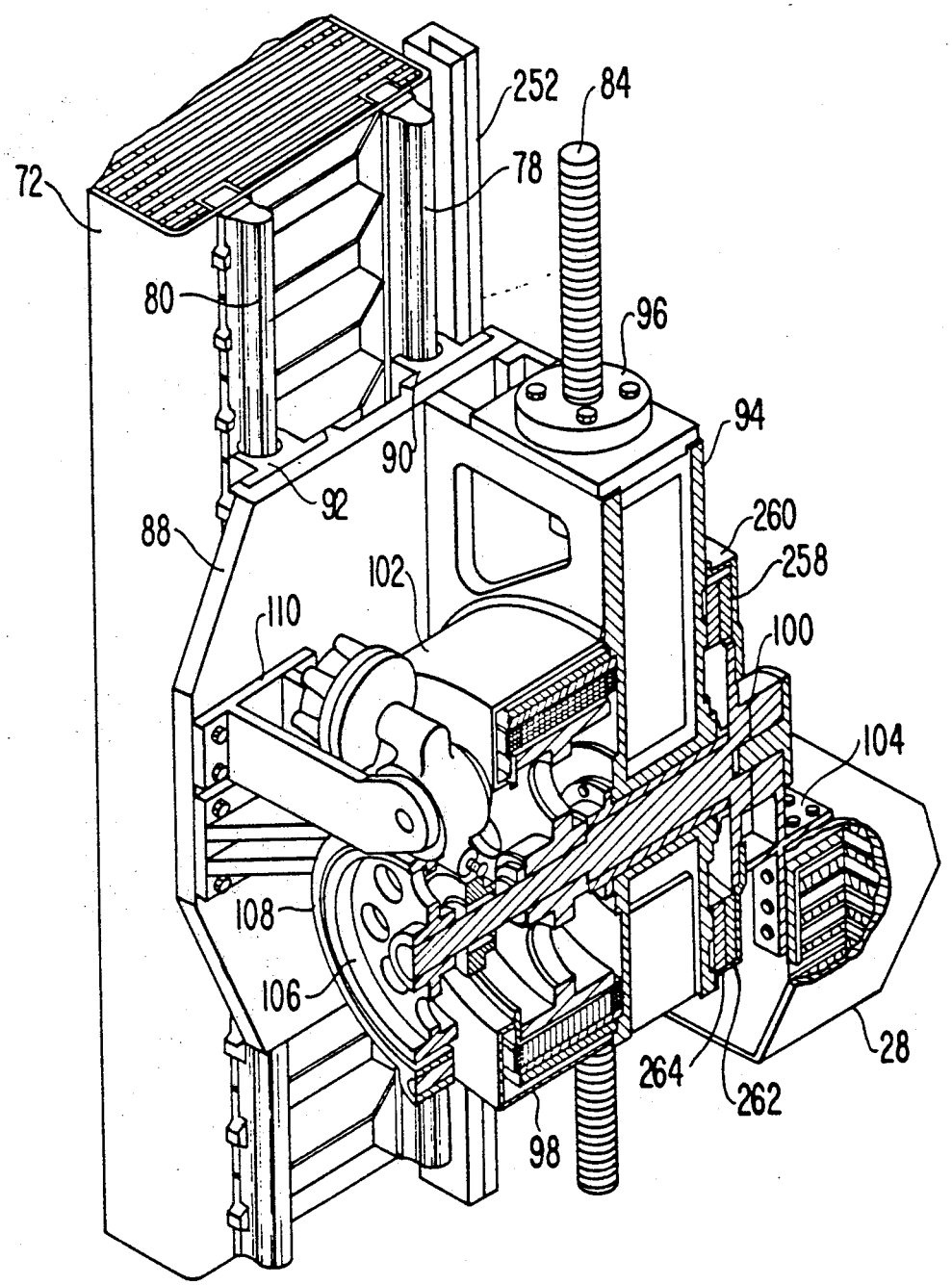
FIG. 5 is a partially cut-away perspective view of a portion of the translating means supporting the cross beam assembly of the invention.
Figure 6:
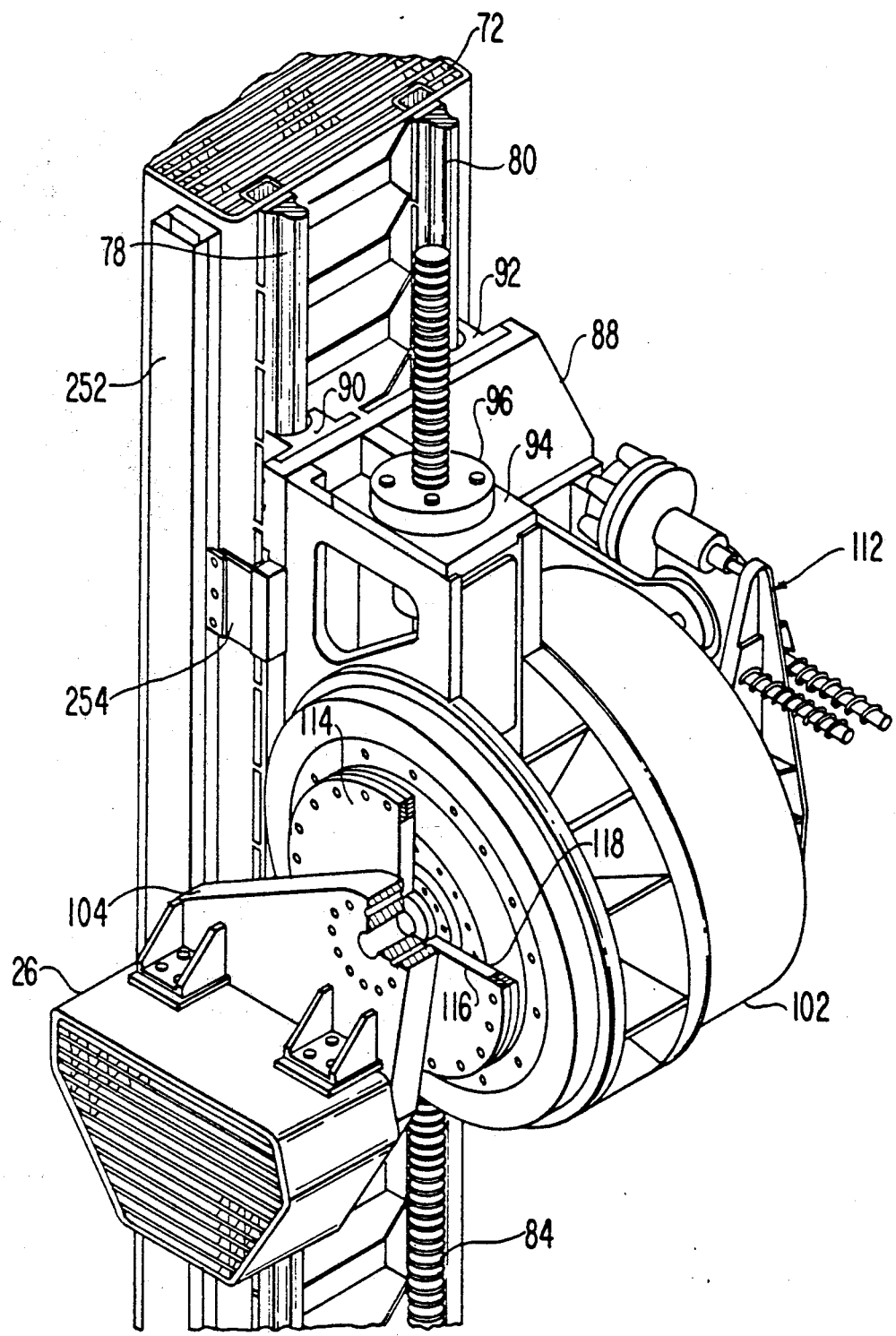
FIG. 6 is a partially cut-away perspective view of another portion of the translating means supporting the cross beam assembly of the invention.

As depicted in FIGS. 1, 5 and 6, second drive means comprises guide structure 72 movably disposed on and engaging tracks 74, 76 which support and guide structure 72 for linear movement with respect to support structures 62, 64. Each guide structure 72 includes tracks 78, 80 for guiding linear movement of the first drive means parallel to Z axis 70. The second drive means also includes a second drive motor and screw assembly including drive motor 82 for operatively selectively rotating elongated screw 84.

The first drive means includes housing 86 movably supported by screw 84 for linear movement along tracks 76, 80 of guide structure 72. Housing 86 includes plate 88 having integral channels 90, 92 for slidably receiving tracks 78, 80. Fixed to plate 88 is support structure 94 to which is secured ball screw nut 96 threadably engaging screw 84 of the second drive motor and screw assembly. Support structure 94 rotatably supports pivot shaft 100 and motor 98 in motor housing 102. Motor 98 drivingly engages pivot shaft 100 for selective rotation thereof. Flange 104 is fixed to one end of cross beam assembly 22 and is fixed to the end of pivot shaft 100 such that rotation of motor 98 pivots cross beam assembly 22 about its elongated axis.

Each first drive means includes a fail safe brake assembly including a brake drum 106 fixed to the opposite end of pivot shaft 100 and a brake shoe 108 fixed by attachment structure 110 to plate 88. Fail safe mechanism 112 normally engages brake shoe 108 with brake 106.

Preferably, flange 104 attached to one end of cross beam assembly 22 is secured to one end of pivot shaft 100 through flex disc structure 114. Flex disc structure 114 includes opposed flexible discs 116, 118 which compensate for non-parallelism which may occur due to inaccuracies in synchronization of movement of the translation means components on the opposed structures 62, 64.

The third drive means, as seen in FIG. 1, comprises a third drive motor and screw assembly 120 including drive motor 122 fixed to support structure 62, 64 and screw 124 threadably engaging guide structure 72 for selectively moving guide structure 72 and the first guide means carried thereby parallel to Y axis 66.

In accordance with the invention, the two arm robot further comprises a pair of arm assemblies supported by the cross beam assembly for selective, independent linear movement parallel to the X and Y axes and means for selectively moving the arm assemblies relative to the cross beam assembly. As depicted in FIG. 1, two arm assemblies 126, 128 are disposed on cross beam assembly 22 for selective independent linear movement parallel to X and Y axes 66, 68. Since both arm assemblies 126, 128 are essentially identical, only one will be described.

Figure 8:
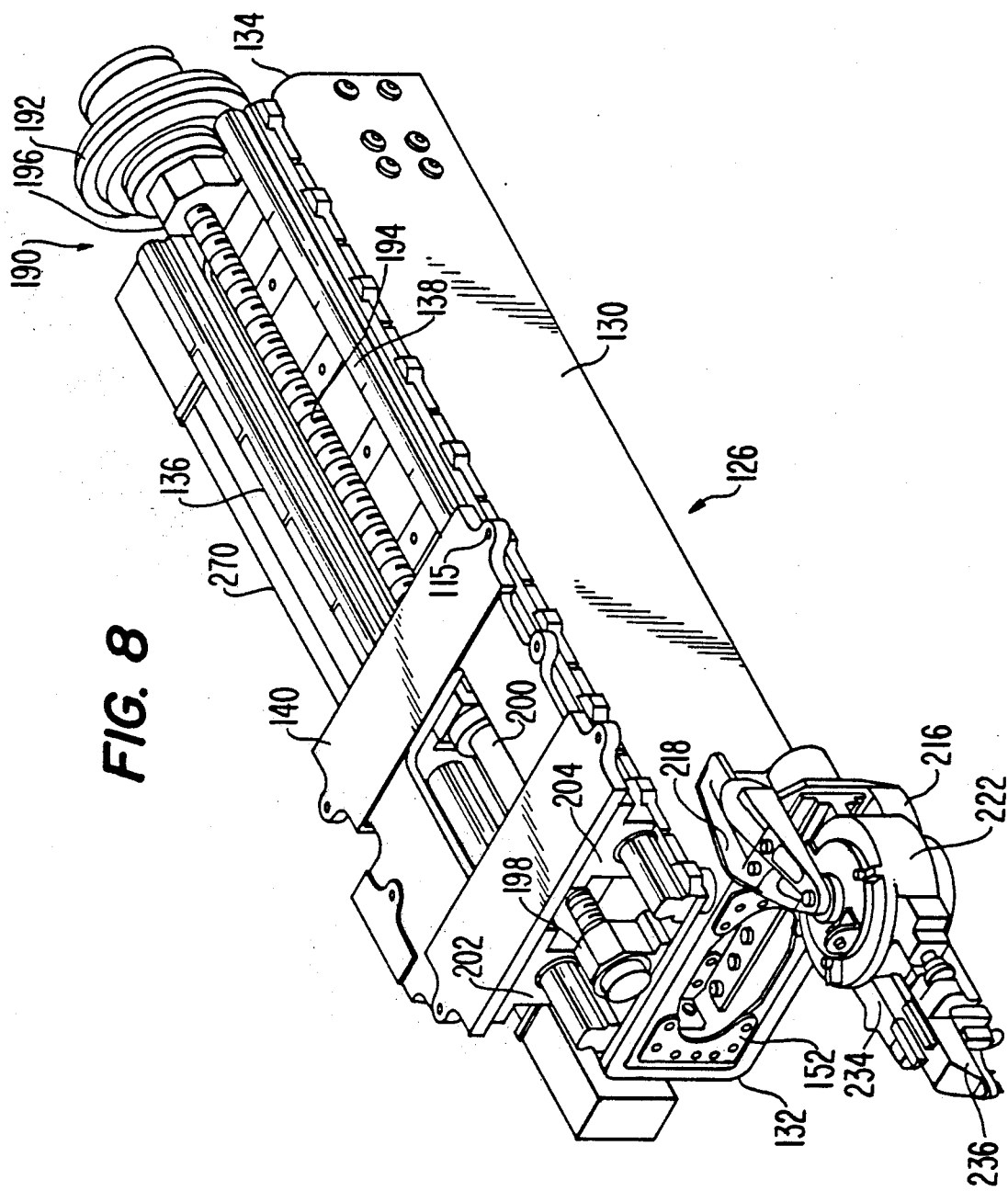
FIG. 8 is an inverted perspective view of one arm assembly and wrist assembly as depicted in FIG. 1.

As best seen in FIG. 8, arm assembly 126 comprises an elongated beam structure 130 having first and second opposed ends 132, 134, an arm track 136, 138 fixed to and extending between first and second ends 132, 134 of beam structure 130, and a second attachment plate 140 slidably carried by arm track 136, 138 for linear movement relative to beam structure 130. Arm assembly 126 in FIG. 8 is depicted inverted from that shown in FIG. 1. Second attachment plate 140 is disposed for attachment to one of first attachment plates 36 slidably disposed on cross beam assembly 22. When first and second attachment plates 36, 140 are secured together, elongated beam structure 130 is disposed generally perpendicular to elongated axis 24 of cross beam assembly 22 as depicted in FIG. 1.

Figure 9:
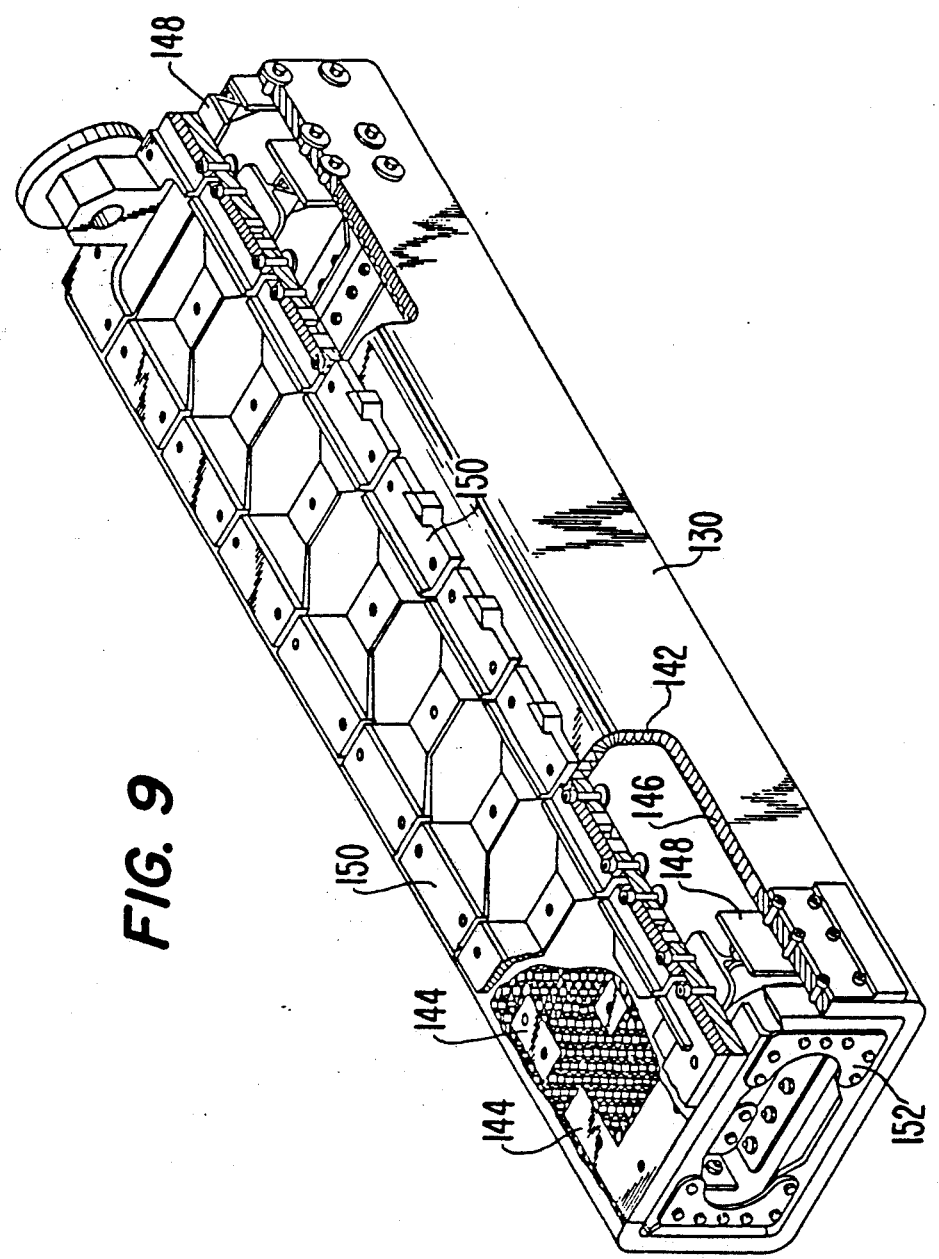
FIG. 9 is a partially cut-away perspective view of the beam structure of an arm assembly of the invention.
Figure 10:
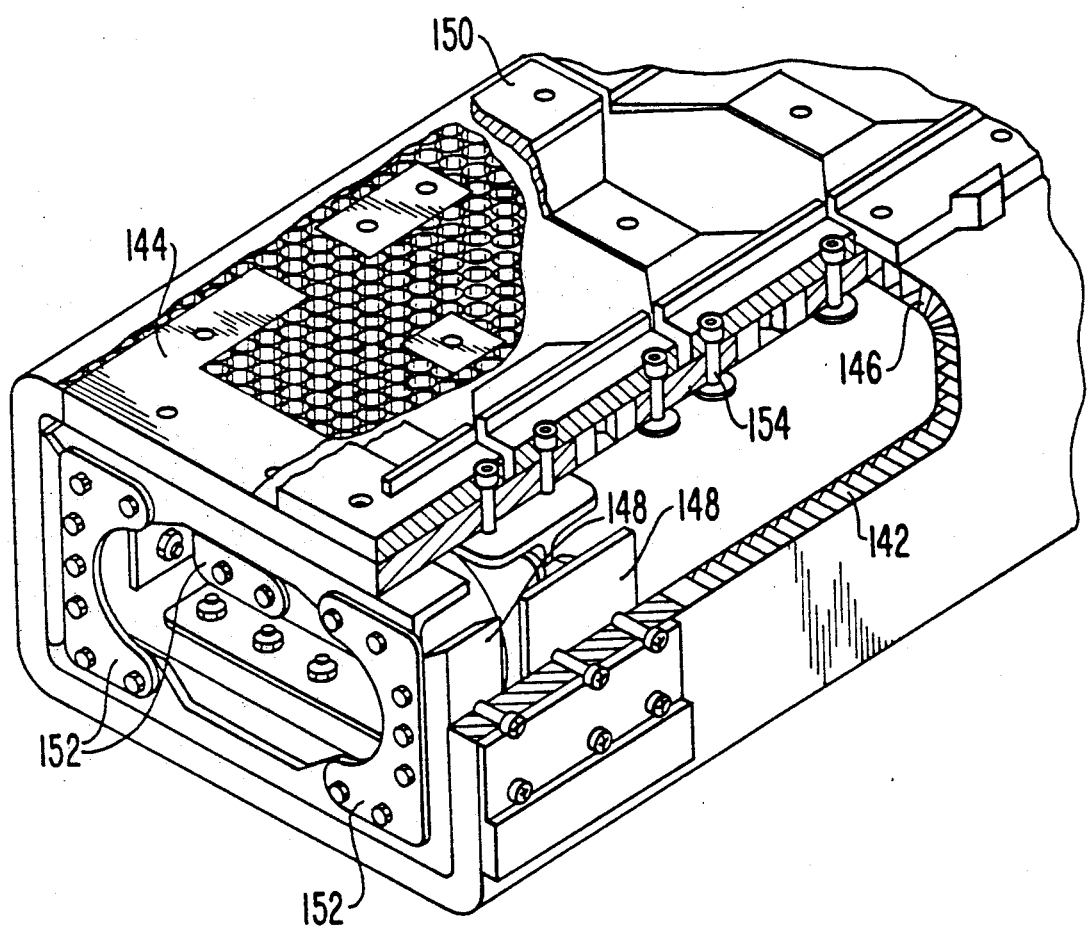
FIG. 10 is an enlarged view of a portion of the structure depicted in FIG. 9.
Figure 11:
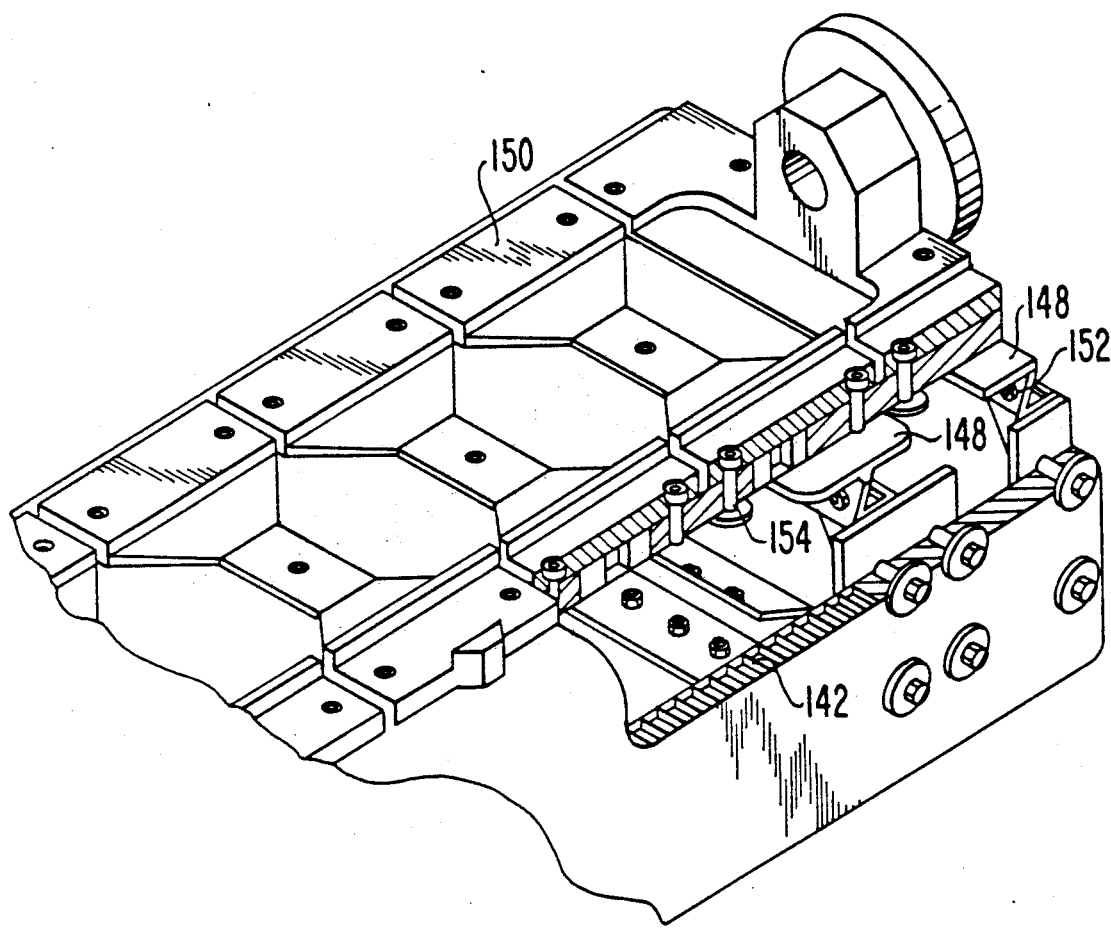
FIG. 11 is an enlarged view of another portion of the structure depicted in FIG. 9.

Preferably, beam structure 130 of each arm assembly 126, 128 as depicted in FIGS. 9-11, is a hollow member having generally rectangular cross section and formed of lightweight, non-metal honeycomb material 142 including metal inserts 144 adhesively implanted in the honeycomb structure in a manner as described with respect to the cross beam assembly above. The honeycomb structure and metal inserts are covered with a skin 146 of thermoset graphite material bonded to the honeycomb structure. The hollow honeycomb structure is internally supported by metal structure clips 148.

Structure clips 148 are secured together by assembly clips 152. Metal base plates 150 are secured to the beam structure 130 by adhesives and through strategically located metal inserts 144 by means of bolts 154 or other known securing means. Tracks 136, 138 are then secured to metal base plates 150. This construction provides for a rigid lightweight structure.

The moving means for the arm assemblies preferably comprises a pair of first arm drive and screw assemblies 160, 162, (FIG. 13) one being fixed to base structure 30 of cross beam assembly 22 proximate each opposed end 26, 28 thereof. As depicted in FIG. 13, one arm drive and screw assembly 160 includes drive motor 182 and drive screw 166 with drive motor 182 being secured proximate one end 28 of cross beam assembly 22. The other arm drive and screw assembly includes a drive motor (not shown) and associated screw 168, the drive motor being disposed proximate the other end 26 of cross beam assembly 22. Drive screws 166, 168 of first arm drive and screw assemblies 160, 162 extend from the respective drive motors in opposite directions with their distal ends being in overlapping relation terminating in bearing housings 180 on opposite sides of Y axis 66 as seen in FIG. 13. The proximal end of drive screws 166, 168 are drivingly fixed to drive motor 164 and the corresponding other drive motor not shown. Each drive motor 182 is mounted in association with a fail safe brake mechanism 164. The drive motor and associated screw are supported at the proximal end by bearing housing 184. Each screw 166, 168 is threadably received in ball screw nut 186 fixed to a respective first attachment plate 36 which includes integral channels 188 slidably disposed on tracks 32, 34. Thus, rotation of drive screws 166, 168 linearly move first attachment plates 36 along tracks 32, 34 for the distance of the respective drive screw. The drive screws are so disposed with respect to Y axis 66 to permit each first attachment plate 36 to move to and through Y axis 66 for a predetermined distance. Naturally, because of the overlapping relationship of the distal ends of drive screws 166, 168, movement of first attachment plates 36 must be coordinated to avoid conflict in the area adjacent Y axis 66.

Since, as mentioned above, second attachment plate 140 on each arm assembly 126, 128 is secured to a respective one of first attachment plates 36, selective rotation of arm drive and screw assemblies 160, 162 moves arm assemblies 126, 128 linearly along elongated axis of cross beam assembly 22.

The moving means for the arm assemblies further comprises a second arm drive and screw assembly 190 (FIG. 8) including a drive motor 192 and a screw 194 fixed to each arm assembly 126, 128. Again, since arm assemblies 126, 128 are essentially identical, only one will be described.

Second arm drive screw assembly 190 is fixed to beam housing 130 through bearing housings 196, 198. Screw 194 is threadably received in ball screw nut 200 fixed to second attachment plate 140 slidably disposed on tracks 136, 138 through channels 202, 204. Rotation of motor 192 rotates drive screw 194 linearly moving second attachment plate 140 along tracks 136, 138 between first and second ends 132, 134 of arm assembly 126. Since, as described above, second attachment plate 140 is secured to first attachment plate 36 such that arm assemblies 126, 128 are disposed generally perpendicular to the elongated axis of cross beam assembly 22, linear movement of arm assemblies 126, 128 with respect to respective second attachment plates 140 moves arm assemblies 126, 128 relative to cross beam assembly 22 generally parallel to Y axis 66.

In accordance with the invention, the two arm robot further comprises a wrist assembly operatively supported by each arm assembly and including power means for selectively moving the wrist assembly about a rotation axis parallel to the Z axis. As may be seen in FIG. 1, each arm assembly 126, 128 include at the one end thereof a wrist assembly 210, 212. Since each wrist assembly is essentially identical, only one will be described.

Figure 12:
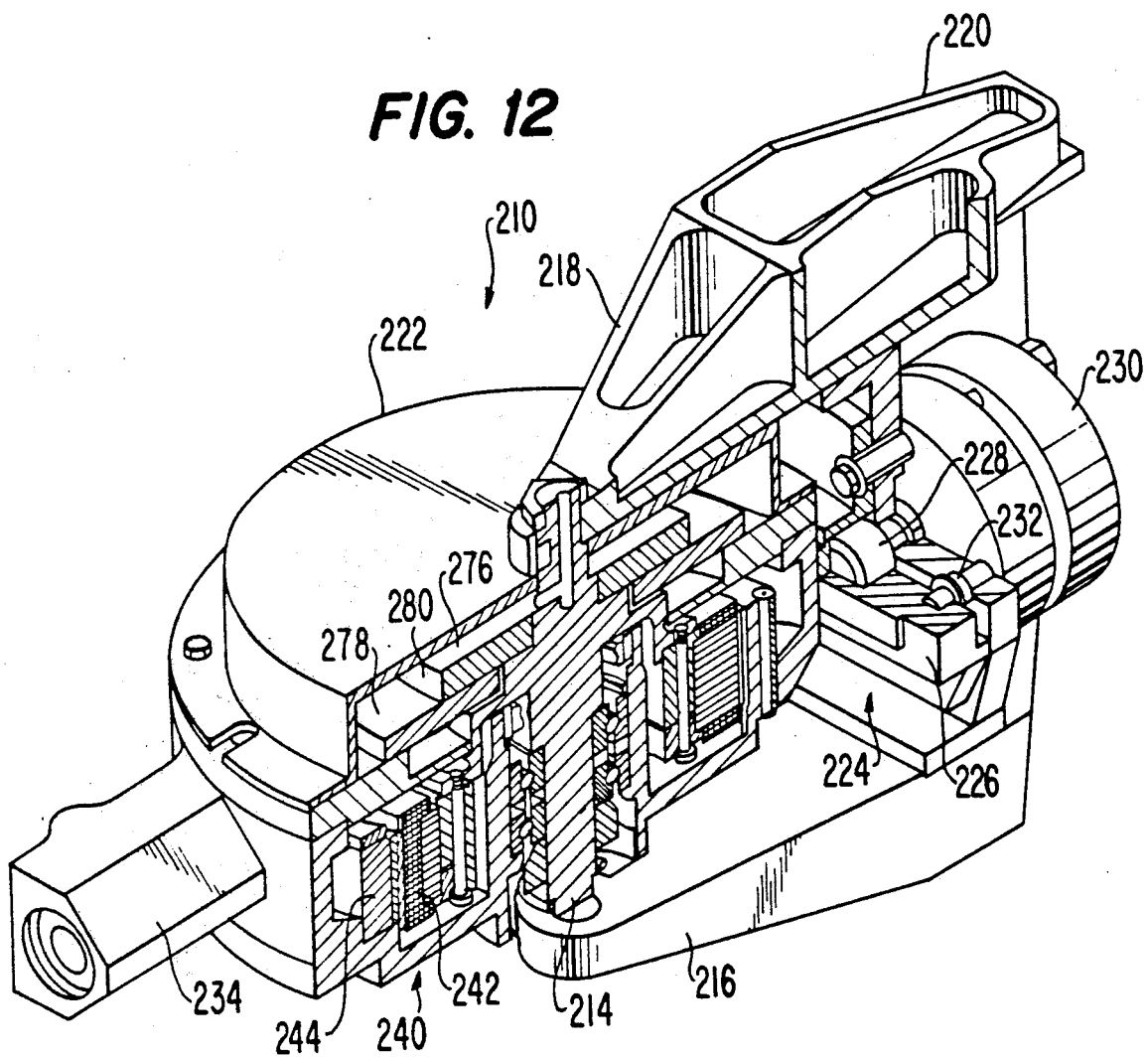
FIG. 12 is a partially cut-away view of the wrist assembly depicted in FIG. 8.

Referring to FIGS. 8 and 12, wrist assembly 210 includes shaft 214 fixed between opposed supports 216, 218 of support structure 220. Support structure 220 is fixed to one end 132 of arm assembly 126.

Each wrist assembly 210, 212 further includes a wrist housing 222 rotatably mounted to shaft 214 between opposed supports 216, 218 of mounting structure 220 fixed to one end 132 of beam structure 130. Shaft 214 generally defines a rotation axis disposed to be parallel to the Z axis. Each wrist assembly further includes a fail safe brake structure 224 including brake shoe 226 fixed to piston 228 for selective movement into and out of engagement with housing 222 in response to pressurization and depressurization of cylinder 230. Brake system 224 is fixed to mounting structure 220 and brake shoe 226 moves relative thereto. Springs 232 disposed between mounting structure 220 and brake shoe 226 biases brake shoe 226 into engagement with housing 222 on release of pressure from cylinder 230.

Each wrist assembly preferably further comprises a gripper socket 234 projecting from housing 222 for selectively operatively engaging and selectively releasing various gripper elements 236 selectably placeable in storage racks as seen in FIG. 1. The structure and operation of the gripper socket and storage racks are disclosed in U.S. patent application Ser. No. 07/251,241 filed Sept. 30, 1988 entitled "Robot End Effector Exchange System", which application is hereby incorporated by reference.

The power means included in each wrist assembly comprises a motor 240 disposed in wrist housing 222 for selectively annularly moving wrist housing 222 relative to shaft 214. As seen in FIG. 12, rotor 242 of motor 240 is attached to shaft 214 and stator 24 of motor 240 is attached to housing 222. Operation of motor 240, therefore, permits selective rotation of housing 220 with associated gripper 234 socket about a rotation axis parallel to Z axis 70.

In the preferred embodiment, the robot of the invention preferably includes means for sensing the amount, direction and rate of movement of each of the arm assemblies, gripper assemblies and the cross beam assembly The sensing means comprises a plurality of individual inductosyn transducer assemblies associated with each of the moving components. As seen in FIG. 1, each support structure 62, 64 of frame assembly 60 includes a linear inductosyn transducer 250 in operative connection with guide structure 72 for sensing the amount, direction and rate of movement of guide structure 72 parallel to Y axis 66. As depicted in FIGS. 1, 5 and 6, linear inductosyn transducer 252 is fixed to each guide structure 72 in operative engagement with element 254 fixed to plate 88 for sensing the amount, direction and rate of movement of housing 86 parallel to Z axis 70. As depicted in FIG. 5, each first drive means includes rotary inductosyn transducer 258 in housing 260 including rotor 262 attached to pivot shaft 100 and stator 264 attached to support structure 94 to sense the amount, rate and direction of movement of each pivot shaft 100 of each first drive means around elongated axis 24 of cross beam assembly 22.

Figure 14:
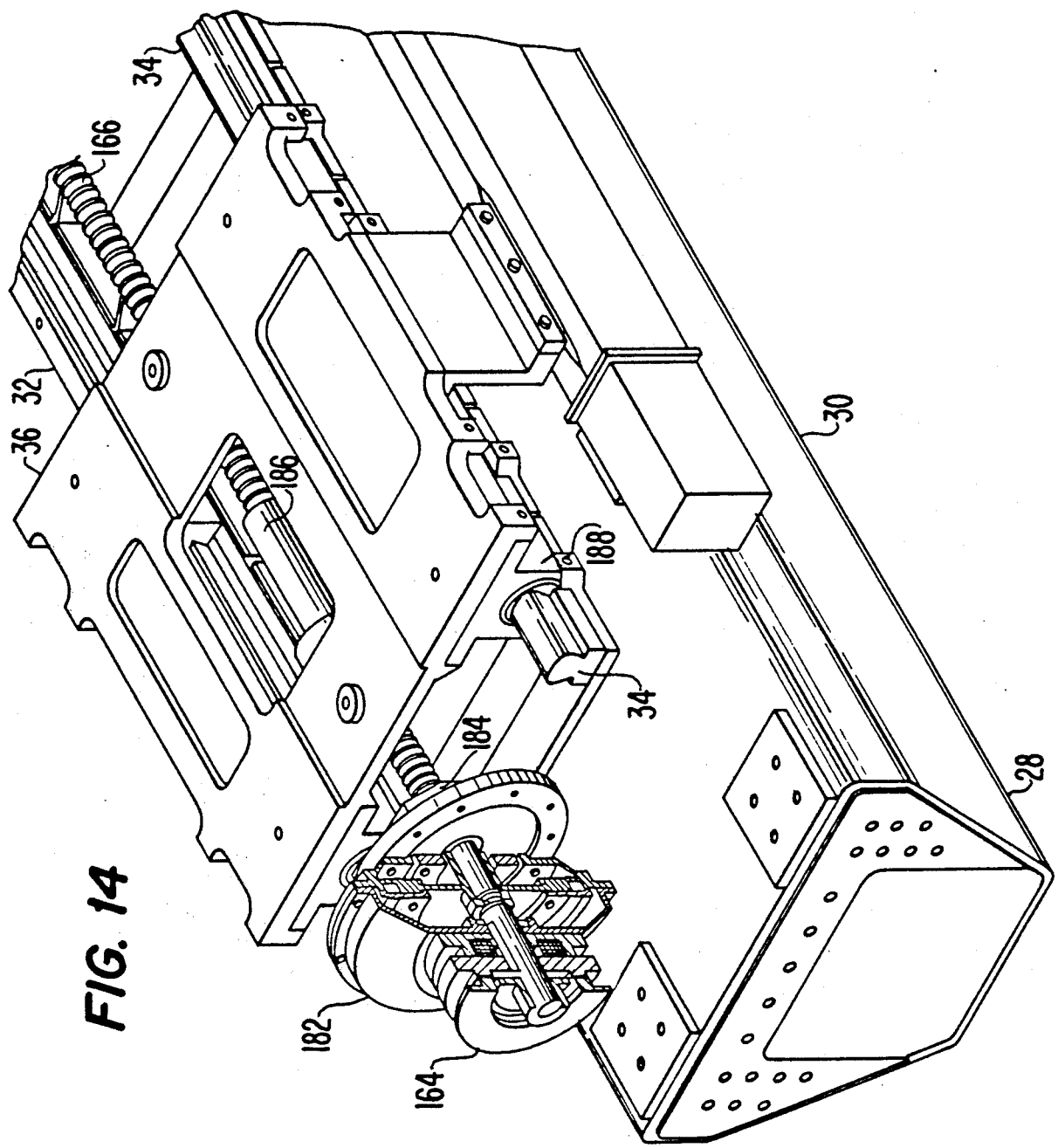
FIG. 14 is an enlarged perspective view of a portion of the apparatus depicted in FIG. 13.
Figure 15:
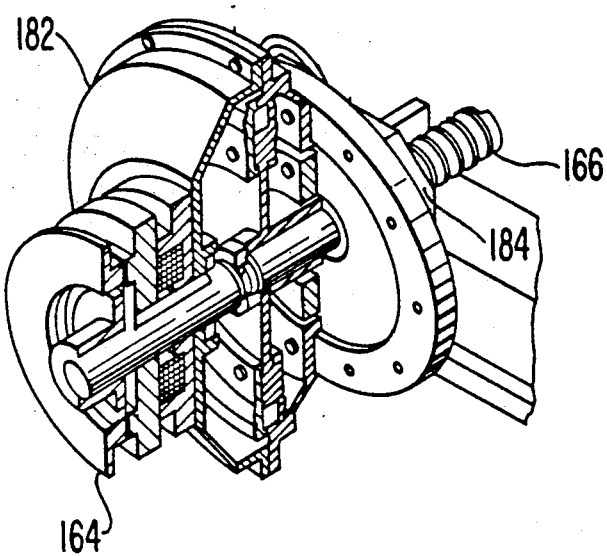
FIG. 15 is an enlarged perspective view of a portion of the apparatus depicted in FIG. 14.
Figure 16:
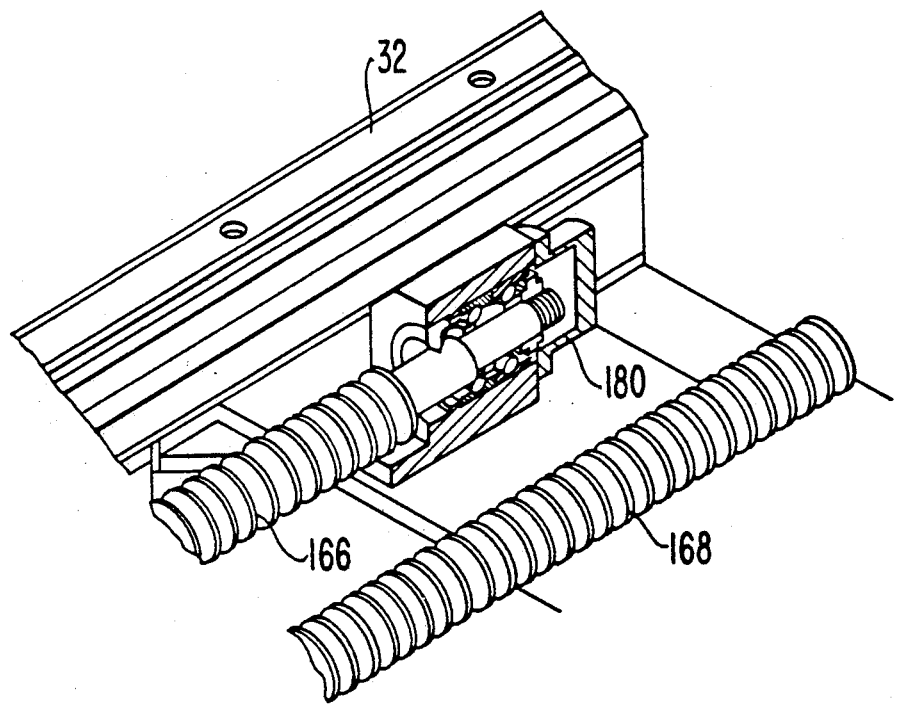
FIG. 16 is an enlarged perspective view of another portion of the apparatus depicted in FIG. 13.

As depicted in FIG. 8, linear inductosyn transducer 270 is fixed to each beam structure 130 of each arm assembly 126, 128 and is operatively connected to a respective second attachment plate 140 to sense the amount, direction, rate of movement of beam structure 130 relative to attachment plate 140 parallel to the Y axis. As depicted in FIGS. 13 and 14, linear inductosyn transducer 272 is fixed to cross beam assembly 22 and disposed to be operatively connected to element 274 fixed to each of first attachment plate 36 to sense the amount, direction and rate of movement of attachment plates 36 along elongated axis 24 parallel to X axis 68. Since arm assemblies 126, 128 are fixed to first attachment plates 36, inductosyn transducers 272 senses movement of arm assemblies 126, 128 parallel to X axis 68.

Finally, as depicted in FIG. 12, rotary inductosyn transducer assembly 276 includes rotor 278 fixed to housing 222 and stator 280 fixed to shaft 214 for sensing the amount, direction and rate of movement of wrist assembly around the rotation axis parallel to the Z axis.

Preferably, the inductosyn transducers associated with the first, second and third drive means communicates the sensed amount, direction and rate of movement thereof for synchronizing movement thereof to maintain generally parallel movement with respect to the orthogonal X, Y and Z axes.

The robot is preferably controlled by computer using feedback from the inductosyn transducers and control signals to the various motors to affect selection and exchange of gripper elements, gripping and releasing of workpieces, and manipulating workpieces. The computer control contemplated is the type described in co-pending application Ser. No. 07/226,552 which has been incorporated herein by reference. Using the computer control system described therein, the robot of the invention may be used to manipulate workpieces.

Figure 18:
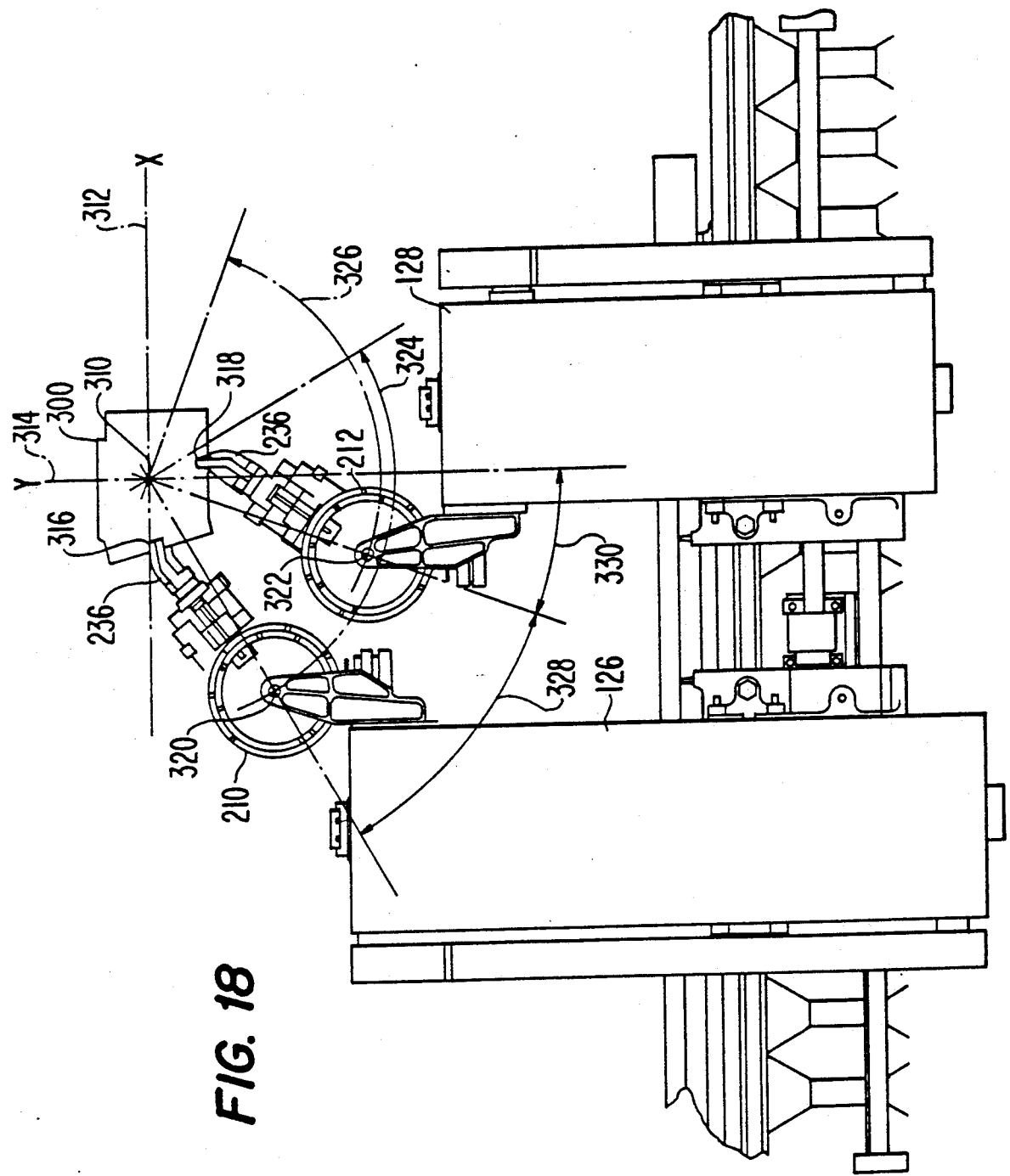
FIG. 18 is a diagrammatic plan view of the arm and gripper assemblies of the invention depicting operation thereof.

Such operation is diagrammatical depicted in FIG. 18. As depicted therein, workpiece 300 includes a computer-defined reference point 310 defined by the intersection of X and Y axes 312, 314. By appropriate commands to the drive motors of the robot, gripper elements 236 engage workpiece 300 at computer determined points 316, 318 relative to reference point 310. As depicted in FIG. 18, the gripper element engage workpiece 300 for rotation of the workpiece in a counter-clockwise direction. The gripper elements would engage workpiece 300 in different positions for different manipulations. To achieve the manipulation, the computer calculates the arc length from reference point 310 to rotation axes 320, 322 of gripper assemblies 210, 212. The computer then calculates appropriate commands to drive motors 164 of first arm drive and screw assemblies 160, 162, to drive motors 192 of second arm drive and screw assemblies 190 on each arm assembly 126, 128, and to drive motors 240 of each wrist assembly 210, 212 to effect coordinated simultaneous movement of rotation axes 320, 322 on arcs 324, 326 while maintaining angle 328 with respect to angle 330. To effect such movement, arm assemblies 126, 128 move to the right as seen in FIG. 18, arm assembly 128 moves upward while arm assembly 126 moves downward as seen in FIG. 18, and both gripper assemblies 210, 212 rotate counter-clockwise as seen in FIG. 18. This coordinated movement rotates workpiece 300 about reference point 310 in a counter-clockwise direction.

All other manipulative functions of the robot of the invention are achieved in the same computer controlled coordinated effort of all drive elements. The inductosyn sensors provide feedback to the computer to permit control of such coordinated movement.

Figure 17:
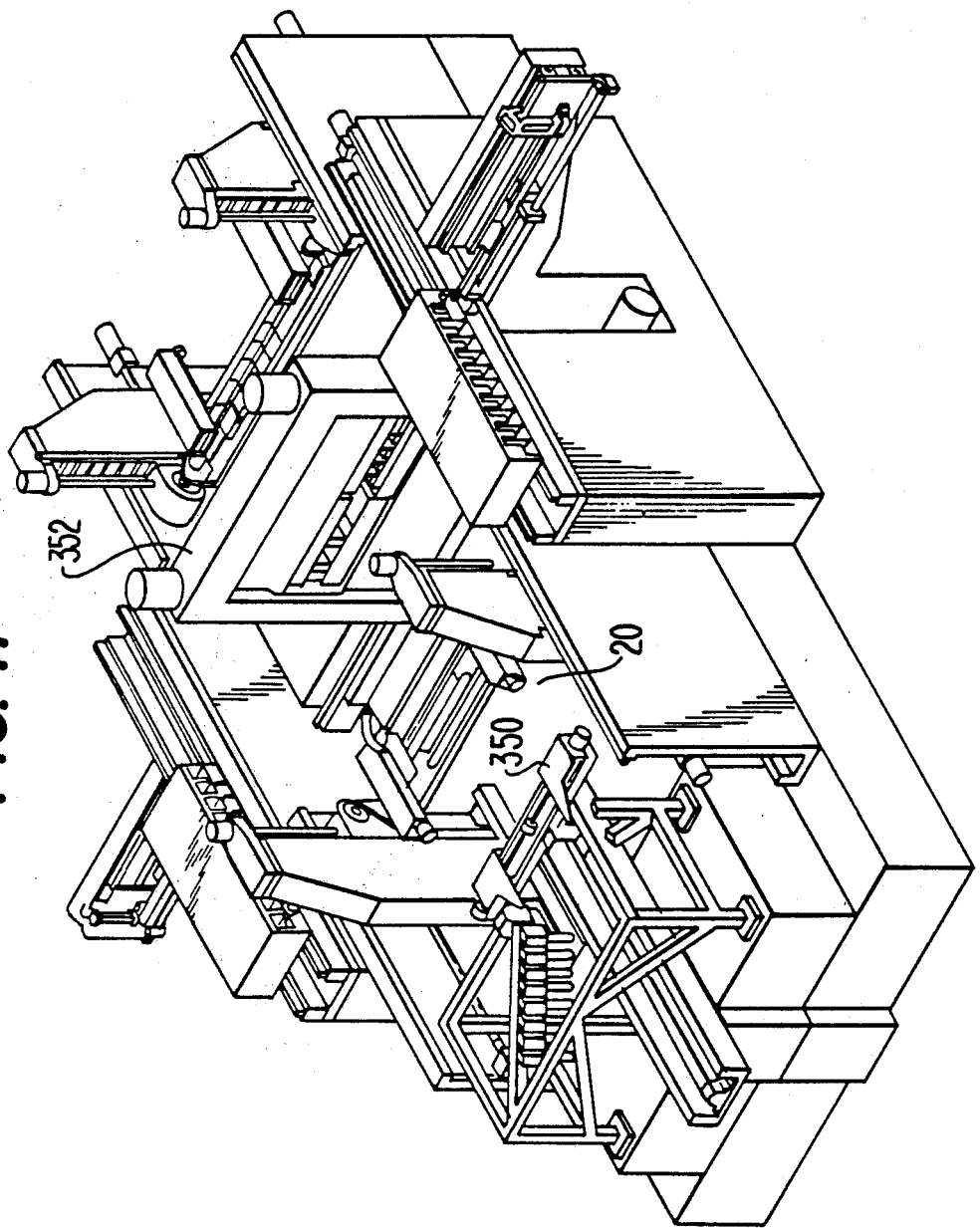
FIG. 17 is a perspective view of a press brake apparatus incorporating a robot of the invention.

In a preferred embodiment, the robot 20 is operatively disposed in a press brake apparatus (FIG. 17) which includes a feed means 350 disposed to present a workpiece in a position for selective gripping and manipulation by robot 20 and a press brake 352 disposed for selective placement by robot 20 of a workpiece in operative areas thereof. Preferably, the press brake includes two operative areas each being disposed to place a bend on a workpiece disposed therein in a direction opposite of the other area.

It will be apparent to those skilled in the art that various modifications and variations may be made to the robot of the invention without departing from the scope or spirit of the invention.

What is claimed is:

1. A two-arm robot for selectively manipulating a workpiece, said robot comprising:

an elongated cross beam assembly having an elongated axis extending between opposed ends;

a frame assembly including translation means supporting said cross beam assembly for selective linear movement parallel to Y and Z axes and for selective pivotal movement about said elongated axis, said elongated axis being parallel to a X axis and said X, Y and Z axes being orthogonal;

a pair of arm assemblies supported by said cross beam assembly for selective, independent linear movement parallel to said X and Y axes;

a wrist assembly operatively supported by each arm assembly and including power means for selectively moving said wrist assembly about a rotation axis parallel to said Z axis; and means for selectively moving said arm assemblies relative to said cross beam assembly.

2. The robot of claim 1 wherein said frame assembly comprises a pair of opposed support structures disposed in spaced parallel relation to said Y axis.

3. The robot of claim 2 wherein each said support structure includes translation means comprising:

first drive means supporting an opposed end of said cross beam assembly for selective pivotal movement about said elongated axis;

second drive means supporting said first drive means for selective linear movement parallel to said Z axis, said second drive means being supported by said respective support structure for linear movement parallel to said Y axis; and third drive means for selectively moving said second drive means relative to said respective support structure parallel to said Y axis.

4. The robot of claim 3 wherein each said support structure includes tracks supporting and guiding the respective second drive means and wherein said third drive means comprises a third drive motor and screw assembly fixed to said support structure and being operatively connected to said respective second drive means for selective linear movement along said tracks.

5. The robot of claim 4 wherein said second drive means comprises a guide structure movably disposed on the tracks of said respective support structure and a second drive motor and screw assembly fixed to said guide structure and being operatively connected to said respective first drive means for selective linear movement parallel to said Z axis, said guide structure including tracks for guiding linear movement of said respective first drive means parallel to said Z axis.

6. The robot of claim 5 wherein said first drive means comprises a housing movably supported by the screw of said respective second drive motor and screw assembly and slidably engaging the tracks of said respective guide structure, a motor operatively supported by said housing and engaging a respective one opposed end of said cross beam assembly for selective pivotal movement thereof, and means for selectively braking said pivotal movement.

7. The robot of claim 1 wherein said cross beam assembly comprises a base structure extending between said opposed ends, an elongated track extending parallel to said elongated axis between said opposed ends, and a pair of first attachment plates carried by said elongated track for independent linear movement along said elongated axis.

8. The robot of claim 7 wherein each said arm assembly comprises an elongated beam structure having first and second opposed ends, an arm track fixed to and extending between the first and second ends of said beam structure, and a second attachment plate slidably carried by said arm track for linear movement relative to said beam structure, said second attachment plate being fixed to a respective one of said first attachment plates.

9. The robot of claim 8 wherein the moving means for said arm assemblies comprises:

a pair of first arm drive and screw assemblies, one said first arm drive and screw assembly being fixed to the base structure proximate each opposed end of said cross beam assembly and being operatively connected to a respective one of said first attachment plates for selective linear movement thereof along the elongated track of said cross beam assembly relative to said base structure and independent of said other first attachment plate; and a second arm drive and screw assembly fixed to the beam structure of each said arm assembly in operative engagement with the second attachment plate thereof for selective linear movement of said arm assembly relative to said cross beam assembly and parallel to said Y axis.

10. The robot of claim 1 wherein each said wrist assembly comprises a shaft fixed to a respective one of said arm assemblies, a wrist housing mounted on said shaft for rotation about said rotation axis, brake means for selectively holding said housing in a desired annular position, and gripper socket means projecting from said housing for selectively operatively engaging and selectively releasing a gripper element.

11. The robot of claim 10 wherein said power means comprises a motor disposed in said wrist housing for selectively annularly moving said wrist housing relative to said shaft.

12. The robot of claim 10 also including a plurality of gripper elements disposed for interchangeable engagement by the gripper socket means of each said wrist assembly.

13. The robot of claim 1 also including means for sensing the amount, direction and rate of movement of each said arm assembly, wrist assembly, and cross beam assembly.

14. The robot of claim 13 also including computer means in operative communication with said sensing means, translation means, power means and moving means for controlling operation of said robot.

15. The robot of claim 3 also including means for sensing the amount, rate and direction of movement of said first, second and third drive means and means for synchronizing movement thereof.

16. The robot of claim 15 also including means interposed between each opposed end of said cross beam assembly and the respective first drive means for compensating for deviations from synchronized movement of said first, second and third drive means.

17. The robot of claim 1 further including a press break apparatus for bending generally planar workpieces, said apparatus comprising:

means for presenting a workpiece to the apparatus in position for selective gripping and manipulation by said robot; and a press break having two adjacent operative areas between a bed and a ram, each operative area being disposed to place a bend on a workpiece disposed therein in a direction opposite the other area, said press break being disposed for selective placement by said robot of said workpiece in said operative areas.

18. A computer-controlled press break apparatus for bending generally planar workpieces, said apparatus comprising:

means for presenting a workpiece to the apparatus;

a press break having two adjacent operative areas between a bed and a ram, each operative area being disposed to place a bend on a workpiece disposed therein in a direction opposite the other area;

a two-arm robot disposed between said presenting means and said press break for selectively moving and manipulating a work piece from said presenting means to said press break to selectively place bends in said workpiece, said robot comprising:

an elongated cross beam assembly having an elongated axis extending between opposed ends;

a frame assembly including translation means supporting said cross beam assembly for selective linear movement parallel to Y and Z axes and for selective pivotal movement about said elongated axis, said elongated axis being parallel to a X axis and said X, Y and Z axes being orthogonal;

a pair of arm assemblies supported by said cross beam assembly for selective, independent linear movement parallel to said X and Y axes;

a wrist assembly operatively supported by each arm assembly and including power means for selectively moving said wrist assembly about a rotation axis parallel to said Z axis;

means for selectively moving said arm assemblies relative to said cross beam assembly; and means for sensing the amount, direction and rate of movement of said gripper assemblies, arm assemblies and cross beam assembly; and a computer in operative communication with said receiving means, press break, translation means, power means, moving means and sensing means for controlling operation of said apparatus to manipulate and bend a workpiece in accordance with a predetermined design therefor stored in said computer.

* * * * *